July 7, 1942.　　　F. FISCHER ET AL　　　2,289,330
CONTROL DEVICE
Filed June 28, 1939　　　2 Sheets-Sheet 1

INVENTORS
Franz Fischer
Heinrich Langgasser
BY Stephen Cerstvik ATTORNEY.

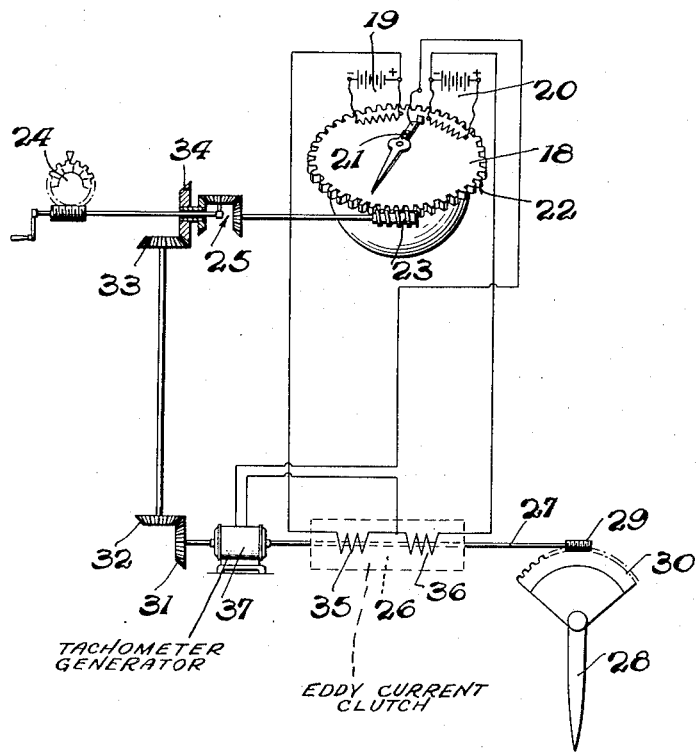

Patented July 7, 1942

2,289,330

UNITED STATES PATENT OFFICE 2,289,330

CONTROL DEVICE

Franz Fischer, Berlin-Wilmersdorf, and Heinrich Langgässer, Berlin-Grunewald, Germany Application June 28, 1939, Serial No. 281,756
In Germany June 28, 1938

4 Claims. (Cl. 172—284)

The invention relates to control devices and more particularly to a device for the adjustment of objects, for example, the control surfaces of aircraft and contemplates particularly the employment of a continually rotating motor. There is provided between the motor and the object to be adjusted a coupling device which is arranged in direct driving connection with the motor. The coupling device may be connected directly or indirectly through the intermediary of a transmission, with the object to be adjusted.

The essence of the invention resides in that an eddy current clutch or coupling serves as connecting device, which eddy current clutch comprises essentially two parts, an exciting part and an eddy current part. According to the invention, the exciting part of the eddy current clutch is formed by the rotor part of the driving motor.

Further, according to the invention, the eddy current clutch is constructed in such a way that the exciting part of the eddy current clutch is itself the rotor part of a drive motor.

Further objects and details of the invention will appear from the following description, when taken in conjunction with the accompanying drawings, which, it is to be borne in mind, are intended to represent merely illustrative embodiments of the invention and not to be considered as limitative thereof and wherein:

Figure 3 is a diagrammatic illustration of an automatic rudder control provided with the novel driving device.

Figure 1:
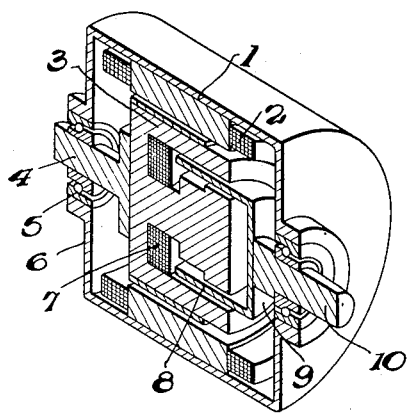
Figure 1 is a vertical section of one embodiment of the eddy current coupling.

Referring to the embodiment of Figure 1, there is provided as driving motor, a continually rotating electric motor. The housing 1 of the motor serves as support for the windings 2 of the motor, which in this embodiment is shown as an induction motor. Nevertheless, instead of such induction motor, any suitable electric motor may be employed. The rotor 3 of the induction motor is shown as a well-known short-circuiting rotor, which is mounted on the shaft 4 in bearings 5 in the end walls 6 of the housing 1.

The rotor 3, according to the invention, is, likewise constructed as the exciting part for the eddy current clutch. In a groove of the rotor 3, there is provided an exciting winding 7 adapted to be fed by direct current, to which winding the direct current is led through slip rings, not illustrated. The exciting member comprises an annular slot in which a cylindrical body 8 of good electrically conducting material projects, for example, a copper cylinder. This cylinder is connected at its outside face 9 to the drive shaft 10. As a result of the eddy currents induced in the copper cylinder during rotation of the rotor 3, which is excited by direct current, the cylinder body is carried around with slip.

Such an eddy current clutch comprises a series of considerable advantages with respect to other clutching devices. It is to be particularly noted that in this arrangement all mechanical friction between two clutched parts is prevented. The eddy current clutch differentiates itself therefore in an advantageous manner from magnetic clutches or coupling devices in which two clutch or coupling parts are magnetically brought into engagement with each other and wherein clutching or coupling is based upon mechanical friction between the two clutch halves.

Without departing from the spirit or scope of the invention, it is possible further to make use of any suitable type of driving motor instead of an electric motor, for example, hydraulic or pneumatically driven motors, such as turbines, bucket wheel devices or the like may be utilized.

The rotor part of the motor may be constructed with a relatively greater mass than the eddy current parts so that the moment of inertia of the rotor is considerably greater than that of the eddy current part. In the event that an increase in the entire moment of inertia of the device is desired, the moment of inertia of the eddy current part may be suitably selected.

Figure 2:
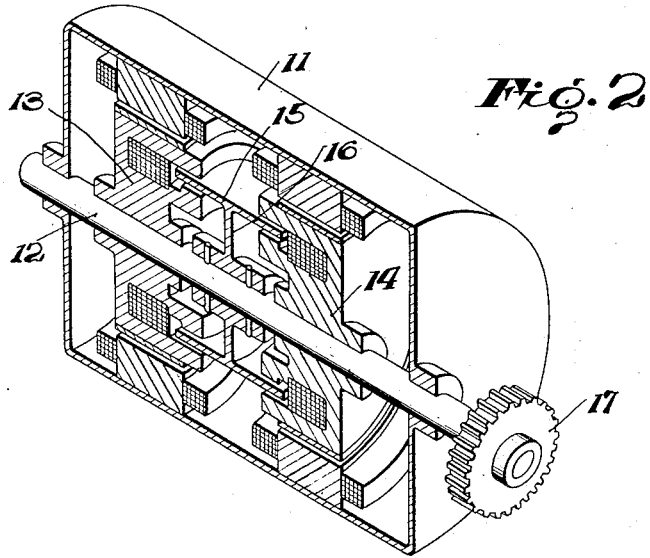
Figure 2 is a vertical section of an embodiment comprising two oppositely rotating drive motors with eddy current clutch.

Referring to Figure 2, there is illustrated an embodiment in which the object to be adjusted is adjusted through the intermediary of a novel device in either one or the other direction. This embodiment is preferably employable in the adjustment of objects which are adjustable in both directions from a zero position, for example the control surfaces of aircraft or also other objects which are adjustable in a determined manner.

In the embodiment of Figure 2, the housing of the driving device is indicated by 11. In both end walls of the housing 11 is journalled a shaft 12 which serves as driving shaft. On this shaft, the two rotor parts 13 and 14 of two oppositely rotating induction motors are rotatably arranged. With each of the two driving motors, there is provided one of the hereinbefore described eddy current clutches or couplings. In the embodiment illustrated and according to the invention the two cylindrical bodies, which are adapted at times to be coupled to the rotor parts, are united in a single cylindrical body 15, and corresponding parts of the eddy current members extend into appropriate grooves of the rotor part. The cylindrical body 15 is connected to the drive shaft 12 through the intermediary of a flange 16.

Preferably both driving motors effect the same number of rotations but in opposite sense. Connected to the drive shaft 12 is a transmission, of which one part 17 is illustrated in the drawing, through which transmission the control surface to be displaced is driven. This arrangement of two oppositely rotating drive motors forms, as indicated, but one constructional embodiment for the purpose of adjusting a rudder or another object of the aircraft, such, for example, a throttle or the like.

Upon one and the same drive shaft, there may be rotatably arranged the rotor parts of several driving motors having the same sense of rotation and to each rotor part a particular eddy current clutch may be connected. The individual eddy current clutches may be switched in or switched out for example in dependence upon the load or also in determined groups. In the same spirit, the eddy current parts of the clutch may be connected together in pairs in the above described manner so that to every two rotor parts an eddy current cylinder is common.

The field excitation in the excitation part of the eddy current clutch does not need to be constant. It may, through the intermediary of particular devices, such as resistance arrangements, be controllable in dependence upon one or several values, so that the degree of response of the eddy current clutch is controllable in a desired manner, so that the coupling responds as a function of the variations of the field excitation.

In Figure 3, there is schematically illustrated the employment of the novel device of the present invention for the adjustment of a control surface in an automatic rudder control for aircraft. As an example of such an automatic control, there is indicated an automatic rudder control with a course device as impulse giver. As course device, a compass 18 is provided, which may be for example a well-known liquid compass. The controlling impulses delivered by this impulse giver will be taken off through the intermediary of a contact device. For this purpose, potentiometers 19 and 20 are provided with which cooperates a needle 21, which, on its free end, carries an electrical contact.

The base of the two-part control is adjustable through the intermediary of a toothed crown 22 on the periphery thereof and a worm 23 engaging therewith. The adjustment may take place manually, for example over the differential drive 25 according to a course giving device 24. Instead of a compass, any other suitable course device or combination of course devices may be provided, as for example an azimuth gyroscope.

At 26, there is schematically indicated a device such as that of Figure 2. The drive shaft 27 thereof is positively connected on the one hand with the rudder 28 through the intermediary of a worm 29 and a toothed segment 30 cooperating therewith. On the other hand, the drive shaft 27 is connected through the intermediary of gears 31, 32 and 33—34 as well as through the differential drive 34 with the course giver 18. The last mentioned adjustable connection constitutes a follow-up connection for the adjustable part of the course giver, namely for the base of the two-part control. Through the intermediary of the two potentiometer devices 19 and 20, it is possible to control in dependence on the swing of the impulse giver, the excitation of the two eddy current couplings or clutches which are indicated by the two schematically illustrated excitation windings 35—36.

As already hereinabove mentioned, the rotor parts of the drive device are provided of a determined mass through the intermediary of which oscillations and shock in the loading may be eliminated.

Furthermore, it should be borne in mind that these mass forces are not to be overlooked in the device which serves as servo motor. In order to prevent over control or hunting, such an electric servo motor must be switched out before reaching the desired position, so that it comes to rest in the desired position. The faster the motor rotates the earlier must it be switched out.

Consequently, in the herein illustrated control, there is provided an additional impulse giver, a tachometer generator 37 which is arranged on the driven shaft. Through this tachometer generator the excitation of the eddy current clutch is influenced in dependence upon the rotation of speed of the driving shaft. The tachometer generator is switched in to the exciting circuit of the eddy current coupling in differential connection. It will be obvious without further explanations that the novel device herein illustrated and described is employable not only for such rudder controls but also for any suitable automatic controls of vehicles particularly aircraft. Withdrawals from the constructional forms illustrated and described are possible without departing however from the scope of the invention and inventive idea. Thus, the eddy current part of the eddy current clutch or coupling may, for example, take any suitable form. The arrangement of the exciting winding and the construction of the rotor part and of the exciting body are illustrated herein merely by way of example and not by way of limitation. Shapes departing from those herein illustrated and described are also possible.

Although but two embodiments have been illustrated and described in detail, it is to be expressly understood that the invention is not limited thereto. For a definition of the limits of the invention, reference will be had primarily to the appended claims.

What we claim is:

1. An electro-magnetic drive comprising a housing, a stator member supported by and within said housing, a rotor member of magnetic material mounted within said housing for rotation upon energization of said stator member, said rotor member having an annular slot formed therein concentric with the axis of rotation of said rotor, a drag cup comprising a hollow cylindrical member of non-magnetic material mounted for rotation within said housing about an axis coaxial with the axis of rotation of said rotor member and having a rim thereof extending into said annular slot, a winding mounted upon said rotor member at one end of said annular slot whereby upon energization thereof a magnetic flux traverses said drag cup and induces eddy currents therein to produce local magnetic fields coacting with the flux produced by said winding to rotate said drag cup by magnetic drag action upon rotation of said rotor member, and a shaft driven by said drag cup.

2. An electro-magnetic drive comprising a housing, a stator member supported by and within said housing, a rotor member of magnetic material mounted within said housing for rotation upon energization of said stator member, said rotor member having a relatively narrow annular slot formed at one end thereof and a relatively large annular slot at the interior thereof communicating with the narrow slot, the slots being concentric with the axis of rotation of said rotor, a drag cup comprising a hollow cylindrical member of non-magnetic material mounted for rotation within said housing about an axis coaxial with the axis of rotation of said rotor member and having a rim thereof extending into said narrow annular slot, a winding mounted within said larger slot for movement with said rotor and arranged upon energization thereof to produce a magnetic flux to traverse said drag cup and induce eddy currents therein whereby local magnetic fields are created in said drag cup for coaction with the flux produced by said winding to rotate said drag cup by magnetic drag action upon rotation of said rotor, and a shaft driven by said drag cup.

3. A reversible electro-magnetic drive comprising a housing, a pair of electric motors within said housing mounted for opposite rotation with respect to each other, each having a stator member supported by said housing, a rotor member of magnetic material for each of said stators, said rotor members having an annular slot formed at their inner ends concentric with the axis of rotation of said rotors, a drag member of non-magnetic material comprising a circular disc provided with a pair of peripheral rims mounted for rotation within said housing about an axis coaxial with the axis of rotation of said rotors and having one of said rims extending into one of said annular slots and the other of said rims extending into the other of said annular slots, a winding mounted within each of said rotors at the closed ends of said slots and arranged upon energization of one of said windings to produce a magnetic flux across a corresponding slot to traverse said drag member whereby eddy currents are induced therein and create local magnetic fields for coaction with the flux produced by the last-named winding to rotate said drag member by magnetic drag action upon rotation of the corresponding rotor, and a shaft actuated by said drag member.

4. A reversible electro-magnetic drive comprising a housing, a pair of electric motors within said housing mounted for opposite rotation with respect to each other, each having a stator member supported by said housing, a rotor member of magnetic material for each of said stators, said rotor members having a relatively narrow annular slot formed at their inner ends and a relatively larger annular slot at their interior communicating with the narrow slots, the slots being concentric with the axis of rotation of said rotors, a drag member of non-magnetic material comprising a circular disc provided with a pair of peripheral rims mounted for rotation within said housing about an axis coaxial with the axis of rotation of said rotors and having one of said rims extending into one of said annular slots and the other of said rims extending into the other of said annular slots, a winding mounted within each of said larger slots and arranged upon energization of one of said windings to produce a magnetic flux across a corresponding narrow slot to traverse said drag member whereby eddy currents are induced therein and create local magnetic fields for coaction with the flux produced by the last-named winding to rotate said drag member by magnetic drag action upon rotation of the corresponding rotor, and a shaft actuated by said drag member.

FRANZ FISCHER.
HEINRICH LANGGÄSSER.